US009397979B2

(12) United States Patent
Devaki et al.

(10) Patent No.: US 9,397,979 B2
(45) Date of Patent: Jul. 19, 2016

(54) ROUTER METHOD AND SYSTEM

(75) Inventors: Vamsi Krishna Devaki, Bangalore (IN); Venkatavaradhan Devarajan, Bangalore (IN); Rangaprasad Sampath, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1087 days.

(21) Appl. No.: 12/765,813

(22) Filed: Apr. 22, 2010

(65) Prior Publication Data

US 2010/0274894 A1 Oct. 28, 2010

(30) Foreign Application Priority Data

Apr. 22, 2009 (IN) .............................. 929/CHE/2009

(51) Int. Cl.
*H04L 29/06* (2006.01)

(52) U.S. Cl.
CPC ........ H04L 63/0272 (2013.01); H04L 63/1441 (2013.01)

(58) Field of Classification Search
USPC .......................... 709/220, 224, 229, 234, 235
See application file for complete search history.

(56) References Cited

U.S. PATENT DOCUMENTS

| | | | | |
|---|---|---|---|---|
| 6,304,912 B1 * | 10/2001 | Oguchi | ............... | H04L 12/5601 370/351 |
| 6,718,383 B1 * | 4/2004 | Hebert | ..................... | H04L 45/22 709/221 |
| 6,763,479 B1 * | 7/2004 | Hebert | ................ | G06F 11/2005 714/4.11 |
| 6,954,436 B1 * | 10/2005 | Yip | ......................... | H04L 45/02 370/217 |
| 7,010,716 B2 * | 3/2006 | Yu | ........................ | G06F 11/2005 709/239 |
| 7,152,179 B1 * | 12/2006 | Critchfield | .......... | H04L 12/2602 714/4.11 |
| 7,209,435 B1 * | 4/2007 | Kuo et al. | ..................... | 370/219 |
| 7,275,192 B2 * | 9/2007 | Taylor | ...................... | H04B 1/74 714/4.11 |
| 7,379,999 B1 * | 5/2008 | Zhou | ................... | G06F 11/3476 709/224 |
| 7,451,209 B1 * | 11/2008 | Schieber | ............. | H04L 41/5012 709/223 |
| 7,516,202 B2 * | 4/2009 | Yu | ........................... | H04L 45/00 709/223 |
| 7,672,228 B1 * | 3/2010 | Senevirathne | ........ | H04L 41/046 370/219 |
| 7,774,391 B1 * | 8/2010 | Le | ...................... | G06F 17/30091 707/822 |
| 7,921,224 B2 * | 4/2011 | Jajoo | ...................... | G06F 11/202 709/224 |
| 7,929,420 B2 * | 4/2011 | Jesuraj | .................... | H04L 45/04 370/218 |
| 7,933,198 B1 * | 4/2011 | Pan | ....................... | H04L 45/586 370/216 |
| 7,936,666 B2 * | 5/2011 | Cheung | ................ | H04Q 3/0087 370/219 |
| 8,014,301 B2 * | 9/2011 | Kuo | ........................ | H04L 45/00 219/252 |
| 8,014,409 B1 * | 9/2011 | Pan | ....................... | H04L 45/586 370/221 |

(Continued)

FOREIGN PATENT DOCUMENTS

IN 929/CHE/2009 4/2009

*Primary Examiner* — Backhean Tiv
(74) *Attorney, Agent, or Firm* — Hewlett Packard Enterprise Patent Department

(57) ABSTRACT

A method and system for operating a virtual router system. A system health index for each of a plurality of physical routers in a virtual router system is determined, and virtual router operation for the physical routers is suspended in response to the system health index.

18 Claims, 3 Drawing Sheets

(56) References Cited

U.S. PATENT DOCUMENTS

| | | | |
|---|---|---|---|
| 8,295,181 B2* | 10/2012 | Bradford | H04L 45/125 370/236 |
| 2003/0016686 A1* | 1/2003 | Wynne | H04L 49/255 370/412 |
| 2003/0202524 A1* | 10/2003 | Conner | H04L 45/20 370/408 |
| 2004/0085965 A1* | 5/2004 | Fotedar | H04L 45/00 370/395.31 |
| 2004/0215821 A1* | 10/2004 | Regan | H04L 45/00 709/240 |
| 2006/0143439 A1* | 6/2006 | Arumugam | G06Q 10/08 713/153 |
| 2006/0149851 A1* | 7/2006 | Matsumoto | H04L 45/00 709/238 |
| 2006/0248369 A1* | 11/2006 | Kumazawa | H04L 45/586 714/4.1 |
| 2008/0052395 A1* | 2/2008 | Wright | H04L 63/20 709/224 |
| 2008/0181241 A1* | 7/2008 | Regan | H04L 45/02 370/401 |
| 2008/0225699 A1* | 9/2008 | Lee | H04L 45/586 370/218 |
| 2009/0252173 A1* | 10/2009 | Sampath | H04L 45/586 370/400 |
| 2010/0034085 A1* | 2/2010 | Qiu | H04M 9/08 370/232 |
| 2010/0274894 A1* | 10/2010 | Devaki | H04L 63/1441 709/224 |
| 2011/0202640 A1* | 8/2011 | Pillutla | G06F 9/5077 709/221 |
| 2011/0243020 A1* | 10/2011 | Ponnuswamy | H04L 41/22 370/252 |
| 2012/0005299 A1* | 1/2012 | Xu | H04L 29/12358 709/208 |
| 2014/0119173 A1* | 5/2014 | Regan | H04L 45/02 370/219 |

* cited by examiner

ROUTER METHOD AND SYSTEM

BACKGROUND

In a network environment, routers are typically used to transfer data packets from one network, such as a Local Area Network (LAN) or a Wide Area Network (WAN) to another. Routers are also used to balance traffic within workgroups of a network. Routers can also provide filtering of inter or intra network traffic for security purposes and policy management.

A number of routers can be connected between a number of network clients and various network equipment. In some situations, these routers can go offline or malfunction. For example, during a power outage the router may lose power and the network connection is lost. Additionally, a router can become overloaded with information and can shut itself down to protect itself or can be overwhelmed by the information such that the router becomes "frozen." In such cases, the data in transit through the router can be lost.

Thus, router redundancy protocols (RRPs), such as the Virtual Router Redundancy Protocol (VRRP) have been developed to allow a number of routers to be configured in a redundant manner. A pair (or more) of VRRP routers ensures connectivity of hosts in a LAN by providing a backup of the default gateway functionality. The Master VRRP router acts as the default gateway and forwards packets sent by the hosts in the VRRP Virtual LAN (Vlan). On the failure of the Master VRRP router due to local or network events, the highest priority Backup VRRP router takes control and provides the default gateway functionality for the hosts in the Vlan. By doing so, it prevents the loss of network connectivity to hosts in the LAN.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In the following disclosure, specific details may be set forth in order to provide a thorough understanding of the disclosed systems and methods. It should be understood however, that all of these specific details may not be required in every implementation. In other instances, well-known methods, procedures, components, circuits, and networks have not been described in detail so as not to unnecessarily obscure the disclosed systems and methods.

It will also be understood that, although the terms first, second, etc. are used herein to describe various elements, these elements should not be limited by these terms. These terms are only used to distinguish one element from another.

Figure 1:
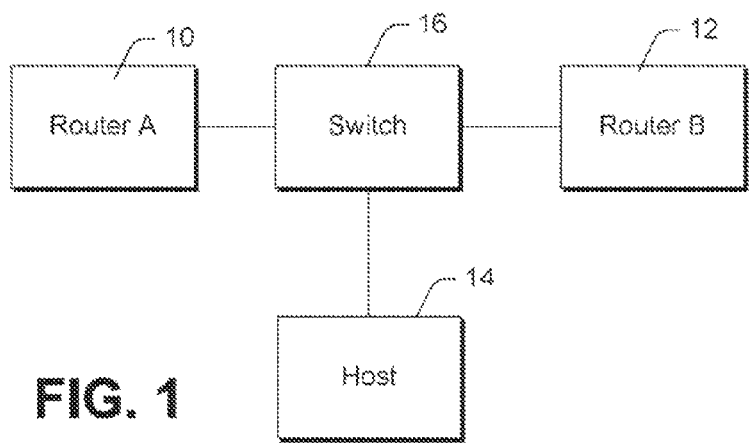
FIG. 1 is a block diagram conceptually illustrating a virtual router system in accordance with embodiments of the present invention.

FIG. 1 is a block diagram conceptually illustrating a virtual router system, where multiple physical routers 10, 12 implement one virtual router instance in a typical Virtual Router Redundancy Protocol (VRRP) environment. The first and second routers 10, 12 are in the same network or Vlan 14 and interconnected by a network device such as a switch 16. In FIG. 1, the first router 10 is designated the master router and the second router 12 is the backup router. The master router 10 thus acts as the default gateway to other networks for all of the hosts 18 on the Vlan 14.

Often, a statically configured default gateway route is used, since it minimizes configuration and processing overhead on the end-host and is widely supported. However, this creates a single point of failure. Loss of the default router results in a catastrophic event, isolating all end-hosts that are unable to detect any alternate path that may be available.

The virtual router configuration, such as the illustrated VRRP environment, is designed to eliminate the single point of failure inherent in the static default routed environment. VRRP specifies an election protocol that dynamically assigns responsibility for a virtual router to one of the VRRP routers 10,12 on the Vlan 14. The first router 10 controls the IP address(es) associated with the virtual router and is thus the Master router. The VRRP Master router forwards packets sent to the virtual MAC address associated with these IP addresses. VRRP specifies an election process that provides dynamic fail-over in the forwarding responsibility should the Master router 10 become unavailable. Any of the virtual router's IP addresses on the Vlan 14 can then be used as the default first hop router by end-hosts. Advantages gained from using such a virtual router system include a higher availability default path without requiring configuration of dynamic routing or router discovery protocols on every end-host.

The VRRP virtual router has a single MAC address allocated to it, which is used as the source in all periodic VRRP messages sent by the Master router 10 to enable bridge learning in an extended LAN. A virtual router is defined by its virtual router identifier (VRID) and a set of IP addresses. A VRRP router may associate a virtual router with its real addresses on an interface, and may also be configured with additional virtual router mappings and priority for virtual routers it is willing to backup. The mapping between VRID and addresses is coordinated among all VRRP routers on a LAN.

For example, the host 18 accesses an upstream network via a default gateway address of 10.10.10.100 on the first router 10. The master router 10 is designated VRID-1 and assigned priority of 255. If the host 18 desires to reach a device outside the Vlan 14, it sends a packet to the gateway via the master router 10, which will forward the packet to the distant device. The second router 12 provides a backup function, so if the first router 10 fails, the second router 12 takes over. The failover is transparent to the host 18, maintaining the gateway from the host 18 to other networks. In systems with multiple backup routers, the highest priority backup router takes control and provides the default gateway functionality for the hosts in the Vlan 14.

Figure 2:
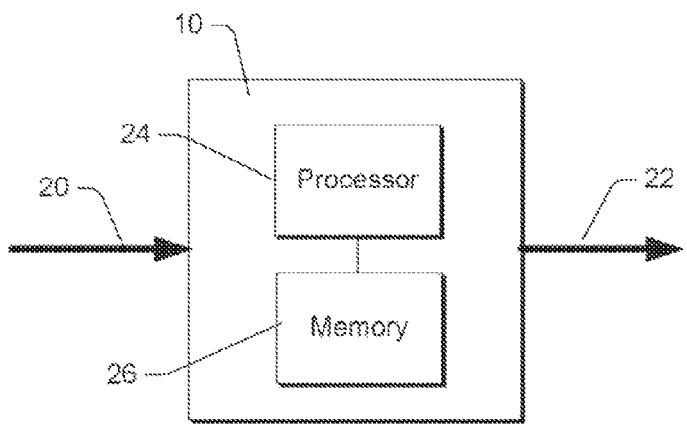
FIG. 2 is a block diagram conceptually illustrating aspects of a router in accordance with embodiments of the present invention.

FIG. 2 is a block diagram conceptually illustrating aspects of an embodiment of the router 10 (the first and second routers 10,12 often are identical in structure). The router 10 is configured to receive packets 20 and output packets 22. A processor 24 is programmed to implement the functions described in greater detail herein. A memory 26, which may be internal or external to the router 10 as shown is provided in some embodiments to store program instructions that when executed by a computer, such as the processor 24, execute embodiments of methods disclosed herein. In various embodiments, the illustrated router 10 includes discrete components, integrated circuitry, programmable logic used in conjunction with a programmable logic device such as a Field Programmable Gate Array (FPGA) or microprocessor, or other devices including combinations thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network.

There are instances in known virtual router systems where a router master or backup takes on the additional burden of forwarding traffic without considering its own system health. In this disclosure, system health refers to the capability of a physical router to function in an optimal manner. A System Health Index (SHI) refers to a metric that is an indicator of a router's system health averaged over periodic intervals of time.

Figure 3:
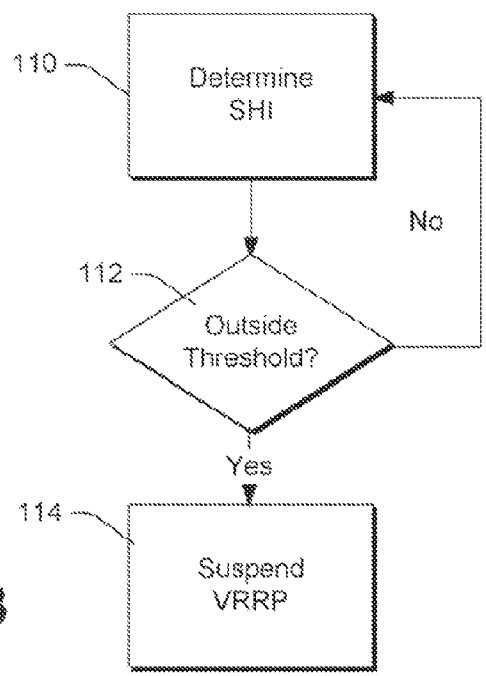
FIG. 3 is a flow diagram illustrating a method for operating a router system in accordance with embodiments of the present invention.

In some embodiments described in this disclosure, SHI is used as a factor in deciding the state transitions of the VRRP router, thereby leading to efficient use of routing resources and network bandwidth. FIG. 3 is a flow diagram broadly illustrating an embodiment of a method for operating a router system. In block 110, the SHI is determined for each of the physical routers 10,12 in the virtual router system. In block 112, the SHI is compared to some threshold, and if it is outside the threshold, virtual router operation is suspended in block 114. If the SHI is within the threshold, the system continues to determine and monitor the SHI.

If the system health of one of the routers 10, 12, is low, continuing to operate the first router 10 as a master router, or taking over as master router by the second router 12 in the event of a failover might worsen the failing health of the particular VRRP router. By factoring system health as a input to a virtual router system, a master router that has poor system health can alleviate its burden by failing over to its backup VRRP router (even if the master router has not yet failed), thereby directing further traffic to its peer.

If the system health of a router in a virtual router system worsens over time, it may impact the forwarding capability of the virtual router system. To avoid such a situation, if the SHI of the master router 10 falls below a threshold, it hands over its default gateway functionality to the backup router 12 by failing over. In accordance with VRRP, the master router 10 can failover by sending a VRRP advertisement packet with priority zero to the backup router 12 requesting it to take over. The master router 10 continues to send priority zero packets periodically to the backup router 12 until the backup router takes over control.

A failover to the backup router 12 benefits the master router 10 in several ways. For example, relinquishing the master router function to the backup router 12 alleviates the burden on the master router 10 as it will no longer act as the default gateway for hosts in the Vlan 14. This reduces the processing overhead such as route table management, ARP table management, learning of new hosts etc.

Further, the failover may allow the master router 10 to recover from its state of poor health because system resources may get freed up and hence become available for use. Moreover, a fail-over may ease the monitoring and troubleshooting of the router with poor system health as this router no longer acts as the default gateway.

A Master VRRP router that has failed-over to its Backup for reasons of poor system health continues to be in the suspended state with respect to VRRP—it does not process any VRRP network events (packet receive) or timers. In this state, the Master VRRP router monitors its system health periodically. It will take back Master control once its system health index is back to an acceptable level.

A backup VRRP router, such as the second router 12, with poor system health need not take on the additional burden of being a master VRRP router, which could exacerbate its failing health. Thus, in some embodiments, the VRRP backup router decides to become a master router only after an examination of its SHI. If the SHI is below the desired threshold, for example, the backup router could suspend the VRRP state machine. The VRRP state machine is suspended and therefore may choose not to take any action on the timer events and network events (packet receive) until the system health index recovers. On the occurrence of every timer or network event, the backup router may just check the system health index and not take any further action if the system health has not improved to an acceptable level.

Alternatively, or in addition to suspending the VRRP operation on the backup router, the system could flush all the VRRP packets that are outstanding in the system and restart all requisite timers. By doing this, the backup router postpones any decision that had to be taken by the state-machine to a later time, thereby providing an opportunity for the system health to recover in that time.

Figure 4:
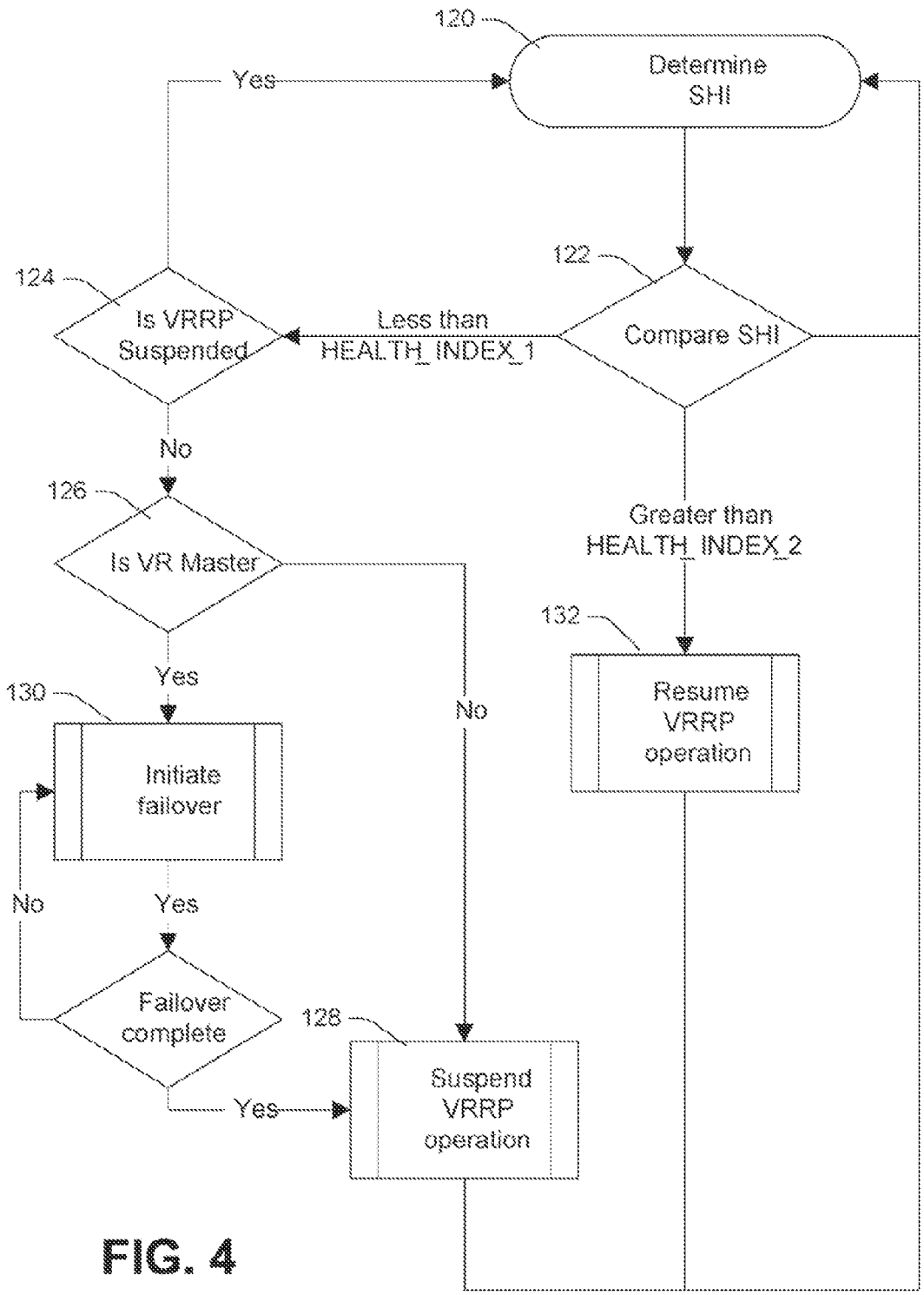
FIG. 4 is a flow diagram illustrating further aspects of a method for operating a router system in accordance with embodiments of the present invention.

FIG. 4 is a flow diagram illustrating further aspects of an embodiment of the method for operating a virtual router system, in which the SHI is used as a trigger to the VRRP state machine. In general, a VRRP router whose SHI has dipped below a first threshold suspends normal VRRP operation. A suspended VRRP router resumes normal operation if the system health index exceeds a second threshold. In some embodiments, the second threshold is greater than the first threshold.

In block 120, the SHI is determined. In some embodiments, a system health monitor function is executed by the processor 24, where the SHI is calculated and monitored. In block 122, the SHI is compared to one or more predetermined thresholds, such as first and second thresholds HEALTH_INDEX_1 and HEALTH_INDEX_2. If the SHI is greater than the first threshold, the system continues to calculate and monitor the SHI. If the SHI is less than the first threshold, the system determines whether VRRP has been suspended on the particular router in block 124. If VRRP has been suspended, the system continues to monitor the SHI. If VRRP has not been suspended, the system determines in block 126 whether the router is a master router. If the router is not a master router, VRRP is suspended on that router in block 128 and the system continues to monitor the SHI. If the router whose SHI has fallen below the first threshold is a master router, the failover process is initiated in block 130, and once it's complete (the VRRP Master router has failed-over to a VRRP Backup router and the VRRP Backup router has become the new Master), VRRP operation is suspended in block 128.

If at some point, health of the suspended router improves sufficiently, VRRP operation is resumed. Thus, if the SHI has increased such that it is above the second threshold as determined in block 122, VRRP operation is resumed in block 132.

In some embodiments, the system health of the router is defined as a measure of the router's capability to function. For example, whether the router can switch or route in an expected and optimal manner. If a VRRP router fails to take its own system health into account before announcing itself as the default gateway, it signs up to forward traffic from the end hosts in the LAN. Such a decision taken by the router could further deteriorate the health of both the router and the network. As noted above, the system health index as used herein refers to a metric that is an indicator of system health averaged over periodic intervals of time.

Figure 5:
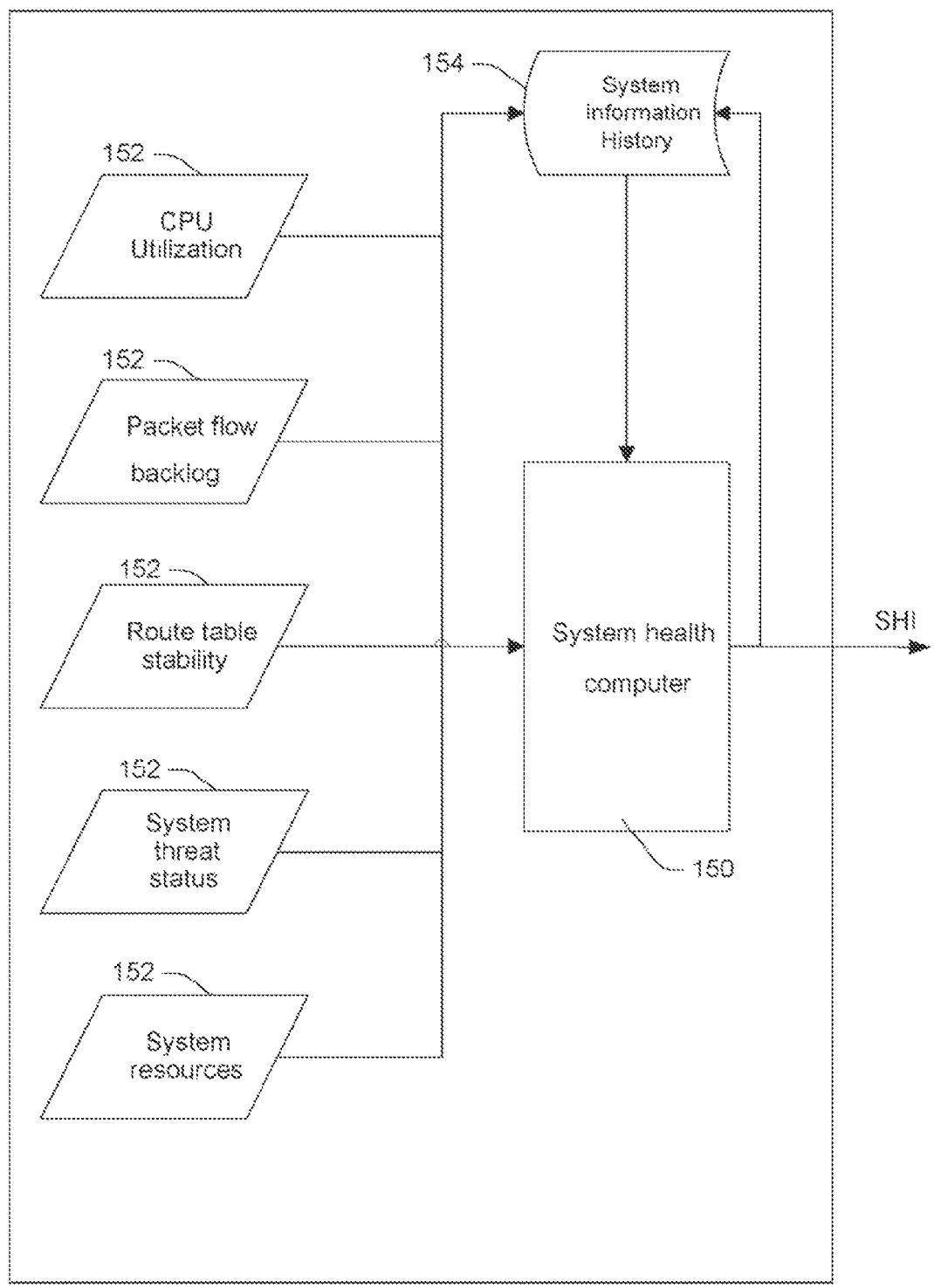
FIG. 5 illustrates a system for calculating a system health index for a router system in accordance with embodiments of the present invention.

FIG. 5 illustrates an embodiment of a SHI computation system suitable for use by the routers 10, 12. A system health computer 150 receives indications of one or more system parameters 152. The system health computer is implemented by the processor 24 (and memory 26 if applicable) in some embodiments, while in other embodiments a computer external to the router 10, 12 performs the SHI computation functions. In various embodiments, one or more of the illustrated system parameters 152 are used to determine the SHI. In further embodiments, additional or completely different parameters can be used.

Examples of parameters 152 used by the system health computer 150 to determine the system health index in some embodiments include the following.

CPU utilization—A high CPU utilization over time is an indicator of poor system health. High CPU utilization can result from the system being constantly busy with existing traffic/load and, thus the system might be unable to deal with additional traffic/load or service new requests in an optimal manner.

Packet backlog—If the number of un-serviced packets grows over time, it could be an indicator of deteriorating system health. This implies that the processor of the router is busy in other tasks and hence, not able to service incoming packets in time and the situation could deteriorate if more traffic were redirected to this router.

Route table stability—Frequent updates to a router's forwarding table indicates instability in the routing environment. If the rate of change of route table is high, it may indicate poor system health.

System under threat—If a network device such as a router is under threat, it is under an attack and therefore it poses a security risk. Accordingly, it could be deemed to be in a state of poor system health. Such a system should not take actions that may redirect more traffic to it.

System resources—The availability of system resources such as free memory pool, available packet buffers, hardware state such as temperature, etc. are indications of system health. A system with ample resources is better equipped to handle an increase in load rather than a system that is low on resources.

The parameters 152 are assigned weighting factors in some embodiments. For instance, if the CPU utilization factor is determined to be more important than other factors in determining system health, it can be weighted more heavily. Thus, the system health index factor could be determined as follows:

$$SHI = \sum_{i=1}^{n} w_i(P_i)$$

where $w_{1 \ldots n}(\ )$ are weight functions of parameters and $P_{1 \ldots n}$ are parameter values.

The system health computer 150 receives the parameter information and in response thereto, averages the system health over some predetermined time period to calculate the SHI. In the embodiment illustrated in FIG. 5, a system information history function 154 also receives the system parameters 152, as well as the computed SHI.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for operating a virtual router system, comprising:
   determining, by a processor, a system health index for each of a plurality of physical routers in a virtual router system;
   comparing the system health index of a first physical router of the plurality of physical routers to a first predetermined threshold;
   in response to the system health index of the first physical router being below the first predetermined threshold, determining whether the first physical router is a master virtual router or a backup virtual router; and
   in response to a determination that the first physical router is a backup virtual router, suspending the first physical router from operating as a virtual router in the virtual router system.

2. The method of claim 1, wherein:
   in response to the first physical router being a master virtual router, initiating a failover to a backup virtual router and, after the failover is complete, suspending the first physical router from operating as a virtual router in the virtual router system.

3. The method of claim 1, further comprising:
   following suspension of the first physical router from operating as a virtual router, ignoring a signal in the first physical router to function as a master router.

4. The method of claim 1, wherein:
   in response to the system health index of the first physical router being above a second predetermined threshold, resuming operation of the first physical router as a backup virtual router.

5. The method of claim 4, wherein the second predetermined threshold is greater than the first predetermined threshold.

6. The method of claim 1, wherein determining the system health index includes analyzing a plurality of system parameters.

7. The method of claim 6, wherein the system parameters are selected from a list including:
   CPU utilization, packet backlog, route table stability, system under threat, and system resources.

8. A virtual router system, comprising:
a first physical router to operate as a master virtual router;
a second physical router to operate as a backup virtual router; and
a system health computer to determine a system health index of the first and the second physical routers,
wherein, in response to the system health index of the second physical router being below a first predetermined threshold, operation of the second physical router as the backup virtual router is to be suspended.

9. The system of claim 8, wherein:
in response to the system health index of the second physical router being above a second predetermined threshold, operation of the second router as the backup virtual router is to be resumed, wherein the second predetermined threshold is higher than the first predetermined threshold.

10. The system of claim 9, wherein:
in response to the health system index of the first physical router being below the first predetermined threshold, a failover to the backup virtual router is to be initiated, and after the failover is complete, operation of the first physical router as a master virtual router is to be suspended.

11. The system of claim 9, wherein:
in response to the second physical router being suspended from being the backup virtual router in the virtual router system, the second physical router is to ignore a signal to function as a master virtual router.

12. The system of claim 10, wherein:
in response to the system health index of the first physical router being above a second predetermined threshold, the first physical router is to resume the master virtual router operation in the virtual router system.

13. The system of claim 12, wherein the second predetermined threshold is greater than the first predetermined threshold.

14. The system of claim 8, wherein the system health computer is to determine the system health index through analysis of a plurality of system parameters.

15. The method of claim 6, wherein the plurality of system parameters have respective values and the respective values are weighted, and wherein determining the system health index comprises calculating the system health index to comprise a sum of the weighted plurality of system parameters.

16. The system of claim 14, wherein the plurality of system parameters have respective values and the respective values are weighted, and wherein the system health computer is to determine the system health index through a calculation of a sum of the weighted plurality of system parameters.

17. A device comprising:
a memory storing machine readable instructions to:
    determine a system health index of a first physical router in a virtual router system,
    compare the system health index of the first physical router to a first predetermined threshold, and
    in response to the system health index of the first physical router being below the first predetermined threshold, determine whether the first physical router is a master virtual router or a backup virtual router;
    in response to the first physical router being a backup virtual router, suspend the first physical router from operating as a virtual router; and
a processor to implement the machine readable instructions.

18. The device of claim 17, the machine readable instructions are further to:
cause the first physical router to resume the virtual router operation as a backup virtual router in response to the system health index of the first physical router being above a second predetermined threshold, wherein the second predetermined threshold is higher than the first predetermined threshold.

* * * * *